(12) United States Patent
Li

(10) Patent No.: US 12,245,297 B2
(45) Date of Patent: Mar. 4, 2025

(54) CONTROL METHOD FOR SLICE NETWORK, TERMINAL, AND NETWORK DEVICE

(71) Applicant: GUANGDONG OPPO MOBILE TELECOMMUNICATIONS CORP., LTD., Dongguan (CN)

(72) Inventor: Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 359 days.

(21) Appl. No.: 17/813,766

(22) Filed: Jul. 20, 2022

(65) Prior Publication Data

US 2022/0353908 A1    Nov. 3, 2022

Related U.S. Application Data

(63) Continuation of application No. PCT/CN2020/074000, filed on Jan. 23, 2020.

(51) Int. Cl.
| | |
|---|---|
| *H04W 48/12* | (2009.01) |
| *H04W 48/18* | (2009.01) |
| *H04W 74/00* | (2009.01) |
| *H04W 74/0833* | (2024.01) |
| *H04W 76/18* | (2018.01) |
| *H04W 76/30* | (2018.01) |

(52) U.S. Cl.
CPC ....... *H04W 74/085* (2013.01); *H04W 74/002* (2013.01); *H04W 76/18* (2018.02); *H04W 76/30* (2018.02)

(58) Field of Classification Search
None
See application file for complete search history.

(56) References Cited

U.S. PATENT DOCUMENTS

| | | |
|---|---|---|
| 2017/0367120 A1 | 12/2017 | Murray et al. |
| 2018/0317264 A1 | 11/2018 | Agiwal et al. |
| 2019/0159108 A1 | 5/2019 | Lee et al. |

(Continued)

FOREIGN PATENT DOCUMENTS

| | | |
|---|---|---|
| CN | 109891943 A | 6/2019 |
| EP | 3474603 A1 | 4/2019 |

OTHER PUBLICATIONS

International Search Report and Written Opinion dated Sep. 24, 2021 in International Application No. PCT/CN2020/074000. English translation attached.

(Continued)

*Primary Examiner* — Gregory B Sefcheck
*Assistant Examiner* — Benjamin Peter Welte
(74) *Attorney, Agent, or Firm* — Sheppard, Mullin, Richter & Hampton LLP

(57) ABSTRACT

The present disclosure discloses a control method for a slice network, a terminal, a network device, a chip, a computer-readable storage medium, a computer program product, and a computer program. The control method includes controlling, by a terminal based on relevant information corresponding to slice information, a processing between the terminal and a network device. The relevant information corresponding to the slice information includes at least one of access control information, a Backoff Indicator (BI), or a timer.

13 Claims, 8 Drawing Sheets

(56) References Cited

U.S. PATENT DOCUMENTS

2019/0230584 A1* 7/2019 Lou et al. ............. H04W 48/16
2022/0078872 A1* 3/2022 Shrestha et al. ...... H04W 48/06
2022/0377613 A1* 11/2022 Watfa et al. .......... H04W 48/06
2023/0120096 A1* 4/2023 Kim et al. ............ H04W 76/18
2023/0300739 A1* 9/2023 Nuggehali et al. .. H04W 74/002

OTHER PUBLICATIONS

ZTE Corporation. "3GPP TSG-RAN WG2 Meeting#AH-1807, Wait time in RRCRelease", R2-1809644, Jul. 6, 2018(Jul. 6, 2018), Section 2-4.

Nokia et al. "3GPP TSG-RAN WG2 Meeting NR Adhoc 1807", Provision of NSSAI by CN for overload control, R2-1810146, Jul. 6, 2018(Jul. 6, 2018), entire document.

Extended European Search Report dated Dec. 6, 2022 received in European Patent Application No. EP20915187.7.

OPPO :"Discussion on Access Control forNetwork Slicing",3GPP Draft; R2-1801792 Discussion on Access Control for Network Slicing ,3rd Generation Partnership Project(3GPP) ,Mobile Competence Centre ; 650, Route Deslucioles ; F-06921 Sophia-Antipolis Cedex vol. RAN WG2, No. Athens,Greece;Feb. 26, 2018-Mar. 2, 2018,Feb. 13, 2018(Feb. 13, 2018) ,XP051398969.

Huawei et al:"Wait timer in RRCRelease ",3GPPDraft;R2-1817517 Wait Timer in RRC Release,3rd Generation Partnership Project(3GPP) , Mobile Competence Centre650,RouteDeslucioles ; F06921, Sophia-Antipolis Cedex ; France vol. RAN WG2, No. Spokane, US,Oct. 12, 2018-Oct. 16, 2018,Nov. 12, 2018(Nov. 12, 2018) ,XP051557043.

* cited by examiner

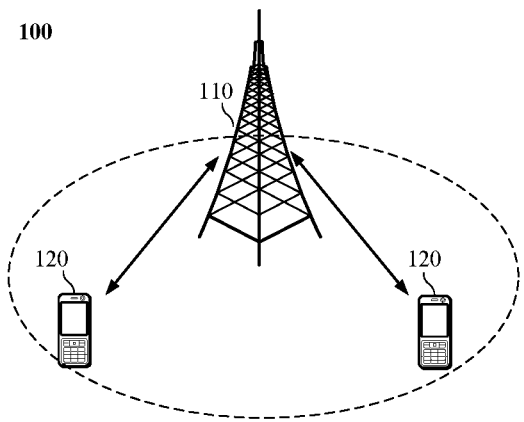
FIG. 1
Controlling, by a terminal based on relevant information corresponding to slice information, a processing between the terminal and a network device — 21
FIG. 2
Performing a processing corresponding to slice information between a network device and a terminal — 31
FIG. 3
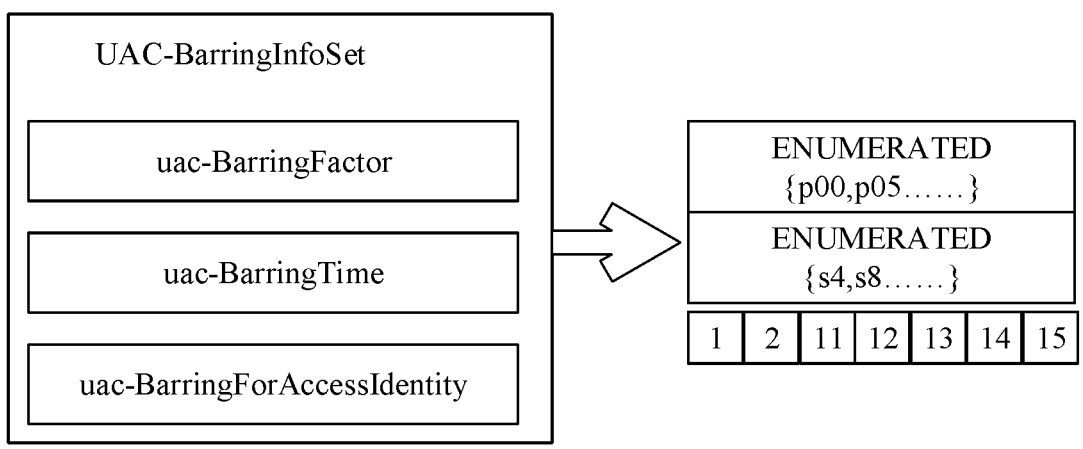
FIG. 4

CONTROL METHOD FOR SLICE NETWORK, TERMINAL, AND NETWORK DEVICE

CROSS-REFERENCE TO RELATED APPLICATIONS

The present application is a continuation of International Application No. PCT/CN2020/074000 filed on Jan. 23, 2020, which is hereby incorporated by reference in its entirety.

TECHNICAL FIELD

The present disclosure relates to the field of communication technology, and more particularly, to a control method for a slice network, a terminal, a network device, a chip, a computer-readable storage medium, a computer program product, and a computer program

BACKGROUND

In the related art, in order to address network overload or network congestion, an overload control mechanism is introduced in a $5^{th}$ Generation (5G) system. Specifically, a base station can transmit a wait time indication to a terminal via a Radio Resource Control (RRC) Reject message or an RRC Release message. The terminal starts a T302 timer with a time length of wait time after entering an idle state. During operation of the T302 timer, the terminal considers that an access to a network is barred, except for access categories 0 and 2. To initiate a service request other than the access categories 0 and 2, it is necessary to wait until the T302 timer expires. In addition, in New Radio (NR), two random access methods are mainly supported, i.e., a contention-based random access method and a contention-free random access method. However, with an introduction of network slicing technology, it is a problem to be solved regarding how to control a processing in a slice network

SUMMARY

To solve the above problems, embodiments of the present disclosure provide a control method for a slice network, a terminal, a network device, a chip, a computer-readable storage medium, a computer program product, and a computer program.

In a first aspect, a control method for a slice network is provided. The control method includes controlling, by a terminal based on relevant information corresponding to slice information, a processing between the terminal and a network device. The relevant information corresponding to the slice information includes at least one of access control information, a Backoff Indicator (BI), or a timer.

In a second aspect, a control method for a slice network is provided. The control method includes performing a processing corresponding to slice information between a network device and a terminal. Relevant information corresponding to the slice information includes at least one of access control information, a BI, or a timer.

In a third aspect, a terminal is provided. The terminal includes a first processing unit configured to control, based on relevant information corresponding to slice information, a processing between the terminal and a network device. The relevant information corresponding to the slice information includes at least one of access control information, a BI, or a timer.

In a fourth aspect, a network device is provided. The network device includes a second processing unit configured to perform a processing corresponding to slice information between the network device and a terminal. Relevant information corresponding to the slice information includes at least one of access control information, a BI, or a timer.

In a fifth aspect, a terminal is provided. The terminal includes a processor and a memory. The memory stores a computer program. The processor is configured to invoke and execute the computer program stored in the memory to perform the method in the first aspect or any implementation of the first aspect.

In a sixth aspect, a network device is provided. The network device includes a processor and a memory. The memory stores a computer program. The processor is configured to invoke and execute the computer program stored in the memory to perform the method in the second aspect or any implementation of the second aspect.

In a seventh aspect, a chip is provided. The chip is configured to perform the method in the first aspect or the second aspect or the method in any implementation of the first aspect or the second aspect.

Specifically, the chip includes a processor configured to invoke and execute a computer program from a memory to cause an apparatus provided with the chip to perform the method in any of the first aspect to the third aspect or any implementation of the first aspect to the third aspect.

In an eighth aspect, a computer-readable storage medium is provided. The computer-readable storage medium stores a computer program. The computer program causes a computer to perform the method in any of the first aspect to the third aspect or any implementation of the first aspect to the third aspect.

In a ninth aspect, a computer program product is provided. The computer program product includes computer program instructions. The computer program instructions cause a computer to perform the method in any of the first aspect to the third aspect or any implementation of the first aspect to the third aspect.

In a tenth aspect, a computer program is provided. The computer program, when executed on a computer, causes the computer to perform the method in any of the first aspect to the third aspect or any implementation of the first aspect to the third aspect.

With the above solutions, a processing corresponding to a slice may be performed based on access control information, backoff information, a timer, and other information related to the slice, thereby meeting new requirements for overload control and access control that are put forward by network services differentiated by slicing, providing fined-grained control at a slice level, and achieving an effect of optimizing network resource utilization and providing better services to users.

BRIEF DESCRIPTION OF DRAWINGS

FIG. 1 is a first schematic diagram showing a communication system architecture according to an embodiment of the present disclosure.

FIG. 2 is a first schematic flowchart illustrating a control method for a slice network according to an embodiment of the present disclosure.

FIG. 3 is a second schematic flowchart illustrating a control method for a slice network according to an embodiment of the present disclosure.

FIG. 4 is a schematic diagram showing Unified Access Control (UAC) according to an embodiment of the present disclosure.

DESCRIPTION OF EMBODIMENTS

Figure 5:
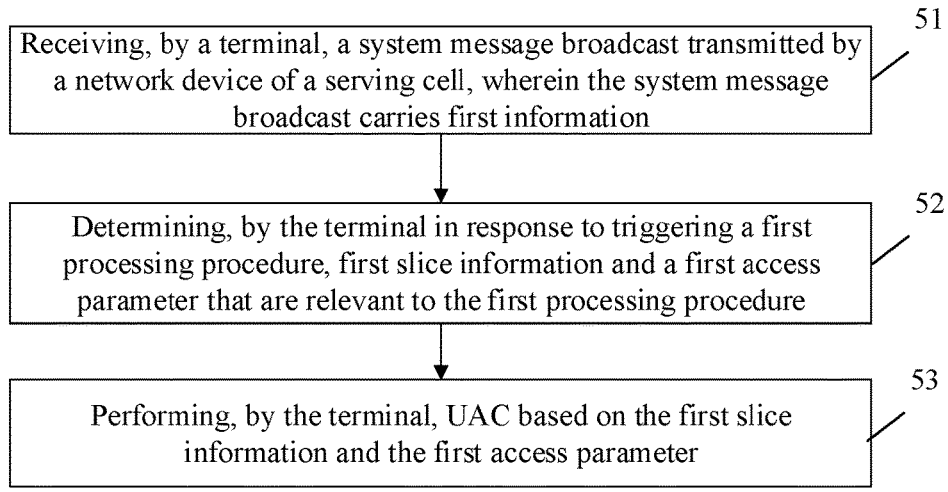
FIG. 5 is a first exemplary flowchart illustrating a control method for a slice network according to an embodiment of the present disclosure.

In order to provide a more detailed understanding of features and technical contents of embodiments of the present disclosure, implementations of the embodiments of the present disclosure will be described in detail below in conjunction with the accompanying drawings. The figures as attached are for illustrative purposes only and are not intended to limit the embodiments of the present disclosure.

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a 5G system, etc.

Exemplarily, a communication system 100 applied in an embodiment of the present disclosure may be as illustrated in FIG. 1. The communication system 100 may include a network device 110. The network device 110 may be a device that communicates with a User Equipment (UE) 120 (or called a communication terminal or a terminal device). The network device 110 may provide communication coverage for a specific geographic region, and may communicate with a UE located in the coverage region. Optionally, the network device 110 may be a network device such as Base Transceiver Station (BTS) in a GSM system or a CDMA system, a network device such as NodeB (NB) in a WCDMA system, an evolutional network device such as Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one UE 120 located within the coverage region of the network device 110. The "UE" used herein includes, but is not limited to, a device configured to receive/transmit a communication signal via a wired line connection, such as a Public Switched Telephone Network (PSTN), a Digital Subscriber Line (DSL), a digital cable, a direct cable connection, and/or via another data connection/network, and/or via a wireless interface, for example, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter, and/or via another UE, and/or an Internet of Things (IoT) device. A UE configured to communicate through the wireless interface may be referred to as a "wireless communication terminal device", a "wireless terminal device", or a "mobile terminal device".

Optionally, direct communication, such as Device to Device (D2D) communication, may be performed between the UEs 120.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

To provide a more detailed understanding of features and technical contents of embodiments of the present disclosure, implementations of the embodiments of the present disclosure will be described in detail below in conjunction with the accompanying drawings. The figures as attached are for illustrative purposes only and are not intended to limit the embodiments of the present disclosure.

Embodiments of the present disclosure provide a control method for a slice network. As illustrated in FIG. 2, the control method includes an action at block 21.

At block 21, a terminal controls, based on relevant information corresponding to slice information, a processing between the terminal and a network device.

Here, the relevant information corresponding to the slice information includes at least one of access control information, a Backoff Indicator (BI), or a timer.

Embodiments of the present disclosure provide a control method for a slice network. As illustrated in FIG. 3, the control method includes an action at block 31.

At block 31, a processing corresponding to slice information is performed between a network device and a terminal.

Here, relevant information corresponding to the slice information includes at least one of access control information, a BI, or a timer.

Solutions provided by the embodiments may be applied in a slice network. The slice information may be Single-Network Slice Selection Assistance Information (S-NSSAI), and of course, may be in other forms, which are not exhaustively enumerated here. In addition, the network device may be an access network device in a network, e.g., a base station such as eNodeB (eNB), gNodeB (gNB), etc.

Relevant description of the slice network is provided below. The strong demand for wireless communication in vertical industries is obvious to all. In order to meet needs of vertical industries in terms of latency, mobility, reliability, position accuracy, etc., a Radio Access Network (RAN) needs to be enhanced in terms of support for vertical services in an access network. One way is to provide, based on network slicing, lower-latency, more targeted, greater-flexibility, and higher-scalability services for services with different requirements.

More specifically, RAN slicing allows application providers to participate in customizing design, deployment, and operations of the RAN to better support services of the application providers. Therefore, Release 17 (Rel-17) introduces enhancement of an access network on slicing. Specifically, the following aspects are involved.

The research project aims to investigate enhancement on RAN support for network slicing. Detailed objectives of the research project are to study mechanisms those enable a terminal to fast access to a cell supporting an intended slice, including [RAN2]:

a. Slice-based cell reselection under network control.

b. Slice-based Random Access Channel (RACH) configuration or access barring.

Note: whether an existing mechanism may meet this scenario or requirement may be studied.

Slicing in Rel-15 involves only a core network side. Specifically, a terminal reports a slicing requirement, and a network selects, based on the slicing requirement reported by the terminal, appropriate Access and Mobility Management Function (AMF) to establish a service session between the terminal and the network.

The slice information may be characterized by a slicing identifier. One piece of S-NSSAI is defined on an RAN side for each slice. One piece of NSSAI is maintained on a terminal side. NSSAI may be a list of S-NSSAI. In addition, one terminal supports at most 8 pieces of S-NSSAI. Of course, the terminal may maintain S-NSSAI in other manners and support more than 8 pieces of S-NSSAI. Such an implementation is only illustrated as an example. The embodiments of the present disclosure are not limited to any of the examples.

Based on the above description, a control method applied in a slice network according to the embodiments is described in detail below in combination with various examples.

Example 1: access control based on slice information.

The terminal receives first information transmitted by the network device.

Here, the first information includes access control information corresponding to each of at least one piece of slice information and/or access control information irrelevant to the slice information.

Here, the first information may be carried by a system broadcast message or other signaling, e.g., RRC signaling, MAC CE signaling, etc. Exhaustive description of the other signaling in this regard will be omitted here.

Specifically, the first information may include at least one of access control information corresponding to each of the at least one piece of slice information, one or more pieces of slice information corresponding to each piece of access control information, or access control information irrelevant to all of the slice information.

That is, the network device transmits the first information to the terminal. Specifically, the network device carries the first information in a system broadcast message and transmits the first information to the terminal. The first information may include one or more pieces of slice information and access control information corresponding to each of the one or more pieces of slice information, or may include access control information irrelevant to the slice information. Here, different pieces of slice information may correspond to a same piece of or different pieces of access control information.

Further, the access control information is a UAC parameter.

Specifically, UAC is introduced in NR for load control on a network side. Access category is defined as illustrated in Table 2 below. Access identity is defined as illustrated in Table 1 below. Meanings of the access category and the access identity are as follows.

TABLE 1

| Access Identity number | UE configuration |
| --- | --- |
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

(NOTE 1):
in the PLMNs where the configuration is valid, Access Identity 1 is used by UEs configured for MPS. The PLMNs where the configuration is valid are HPLMNs, PLMNs equivalent to HPLMNs, and visited PLMNs. Access Identity 1 is also valid when the UE is explicitly authorized by the network based on specific configured PLMNs inside and outside the home country.

(NOTE 2):
in the PLMNs where the configuration is valid, Access Identity 2 is used by UEs configured for MCS. The PLMNs where the configuration is valid are HPLMNs or PLMNs equivalent to HPLMNs and visited PLMNs of the home country. Access Identity 2 is also valid when the UE is explicitly authorized by the network based on specific configured PLMNs inside and outside the home country.

(NOTE 3):
Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country or region of the MCC part of the IMSI.

TABLE 2

| Access Category number | Conditions related to UE | Type of access attempt |
|---|---|---|
| 0 | All | MO signaling resulting from paging |
| 1 (NOTE 1) | UE is configured for delay tolerant service, and is subject to access control for Access Category 1, the access control being determined based on a relation between UE's HPLMN and the selected PLMN. | All except for Emergency |
| 2 | All | Emergency |
| 3 | All except for the conditions in Access Category 1. | MO signaling on NAS level except for that resulting from paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that does not belong to any other Access Categories (NOTE 4) |
| 8 | All except for the conditions in Access Category 1 | MO signaling on RRC level except for that resulting from paging |
| 9-31 | | Reserved standardized Access Categories |
| 32-63 (NOTE 2) | All | Based on operator classification |

(NOTE 1):
The barring parameter for Access Category 1 is accompanied with information that defines whether Access Category applies to UEs within one of the following categories:
a) UEs that are configured for a delay tolerant service;
b) UEs that are configured for a delay tolerant service and are neither in their HPLMN nor in a PLMN that is equivalent to it;
c) UEs that are configured for a delay tolerant service and are neither in the PLMN selector list defined by the operator of the SIM/USIM, nor in their HPLMN or nor in a PLMN that is equivalent to their HPLMN. When a UE is configured for EAB, the UE is also configured for a delay tolerant service. In case a UE is configured both for EAB and for EAB override, when an upper layer indicates to override Access Category 1, then Access Category 1 is not applicable.
(NOTE 2):
When there are an Access Category based on operator classification and a standardized Access Category to which an access attempt can be categorized, and the standardized Access Category is neither 0 nor 2, the UE applies the Access Category based on operator classification. When there are an Access Category based on operator classification and a standardized Access Category to which an access attempt can be categorized, and the standardized Access Category is 0 or 2, the UE applies the standardized Access Category.
(NOTE 3):
Real-Time Text (RTT) is included.
(NOTE 4):
IMS information is included.

For access category 1, uac-AccessCategory1-SelectionAssistanceInfo is configured to assist in determining whether Access Class Barring (ACB) is used for access category 1.

Further, the access control information relevant to the access category and the access identity is broadcast in a Next Generation (NG) RAN (5G-RAN). An Access Stratum (AS) of the terminal performs barring checking based on the access category and the access identity that are provided by the AS/a Non-Access Stratum (NAS) and the broadcasted access control information.

In the solutions provided by the embodiments, the UAC parameter is configured for a slice. That is, the first information transmitted by the network device to the terminal includes the UAC parameter for a slice.

Correspondingly, the controlling, by the terminal based on the relevant information corresponding to the slice information, the processing between the terminal and the network device includes: determining, by the terminal in response to triggering a first processing procedure, first slice information and a first access parameter that are relevant to the first processing procedure; and performing, by the terminal, UAC based on the first access parameter and a first UAC parameter related to the first slice information.

Here, the first processing procedure is an RRC establishment procedure or an RRC resuming procedure.

A premise of UAC is that neither T390 nor T302 is running and the access category is not 0, on which premise a determination is made based on UAC configuration information.

Referring to FIG. 4, when a bit corresponding to an access identity in uac-BarringForAccessIdentity is set as 0, it is indicated that an access is allowed; and when the corresponding bit is set as 1, a further determination is required as follows.

A random number (rand) satisfying 0≤rand<1 is generated. When the random number is smaller than uac-BarringFactor, it is indicated that an access is allowed, otherwise an access is prohibited.

When an access is prohibited, a random number (rand) satisfying 0≤rand<1 is generated, T390 is started and T390= (0.7+0.6*rand)*uac-BarringTime.

For an event triggered by the NAS, the NAS determines an access identity, an access category, and a cause value. The NAS provides the access identity and the access category to the AS, and the AS is responsible for barring checking. When the access identity and the access category pass the checking, the AS notifies the NAS of the checking result, and the NAS provides a cause to the AS. Based on ACB checking feedback from the AS layer, the NAS is responsible for stopping or allowing service transmission.

Solutions provided in this example will be described in detail in combination with FIG. 5.

At block 51, a terminal receives a system message broadcast transmitted by a network device of a serving cell. The system message broadcast carries first information. Here, the first information is access control information relevant to slice information. Specifically, the first information may include at least one of: one set of UAC parameters that is related to each slice (S-NSSAI) and is broadcasted by the network; one set of UAC parameters that is related to multiple slices (S-NSSAI); or a UAC parameter unrelated to the slice information (e.g., a UAC parameter in an existing System Information Block 1 (SIB1)), the UAC parameter being used for access control when no slice information is provided during establishing/resuming a connection by the NAS or an RRC layer.

At block 52, the terminal determines, in response to triggering a first processing procedure, first slice information and a first access parameter that are relevant to the first processing procedure.

Here, the first processing procedure may be an RRC establishment procedure or an RRC resuming procedure.

That is, an action at block 52 is specifically that, when an RRC setup procedure or an RRC resume procedure is triggered on a terminal side, the terminal determines slice information, an access category, and an access identity that are relevant to the RRC setup procedure or the RRC resume procedure.

Here, the determining, by the terminal, the first slice information and the first access parameter that are relevant to the first processing procedure is performed by one of: indicating, by an NAS of the terminal in response to triggering the first processing procedure, the first slice information and the first access parameter to an AS, in which the first access parameter includes a first access category and a first access identity; or in response to an AS of the terminal triggering the first processing procedure based on an NG RAN paging, determining, by the terminal, slice information used for a previous RRC connection as the first slice information, setting, by the terminal, a first access category in the first access parameter as a first value, and adopting, by the terminal, an access identity indicated by an NAS as a first access identity in the first access parameter; or in response to the terminal triggering the first processing procedure by an RAN Notification Area (RNA) update, setting, by an AS of the terminal, the first slice information as null, setting, by the terminal, a first access category in the first access parameter as a second value, and adopting, by the terminal, an access identity indicated by an NAS as a first access identity in the first access parameter.

Each of the above three cases will be described below.

Case 1: the NAS of the terminal indicates, in response to triggering the first processing procedure, the first slice information and the first access parameter to the AS, in which the first access parameter includes the first access category and the first access identity.

Specifically, when the RRC establishment procedure or the RRC resuming procedure is triggered by the NAS of the terminal, the NAS indicates to the AS the first slice information (i.e., first S-NSSAI) while indicating to the AS the first access category and the first access identity in the first access parameter.

In this case, it should be noted that while indicating the first access parameter to the AS, the NAS may further indicate establishmentCause or resumeCause to the AS. That is, the AS can obtain a cause value for this RRC establishment and determine a corresponding cause based on the cause value; or the AS can know a cause for this RRC resume.

Case 2: suppose that a procedure is triggered by the AS (mainly for RRC Resume).

In response to the AS of the terminal triggering the first processing procedure based on the NG RAN paging, the terminal determines the slice information used for the previous RRC connection as the first slice information, sets the first access category in the first access parameter as the first value, and adopts the access identity indicated by the NAS as the first access identity in the first access parameter It may be that when the RRC resuming procedure is triggered by the AS of the terminal in response to NG-RAN paging, the terminal uses the slice information for the previous RRC connection (i.e., before a suspend), i.e., S-NSSAI, and determines the slice information used for the previous RRC connection as the first slice information (i.e., the first S-NSSAI). In addition, the AS sets the first access category in the first access parameter as the first value, and uses the access identity indicated by the NAS as the first access identity.

Here, the first value may be set as desired. For example, the first value may be set as "0" in this case.

Case 3: suppose that a procedure is triggered by the AS (mainly for RRC Resume).

In response to the terminal triggering the first processing procedure by the RNA update, the AS of the terminal sets the first slice information as null, sets the first access category in the first access parameter as the second value, and adopts the access identity indicated by the NAS as the first access identity in the first access parameter.

Specifically, when the RRC resume procedure is triggered by the RNA update (an RAN-based notification area), the first slice information, i.e., the first S-NSSAI, is set as null. The AS sets the first access category in the first access parameter as the second value, and uses the access identity indicated by the NAS as the first access identity.

Here, the second value may be used to characterize a presence of an emergency service in progress or an absence of an emergency service in progress. For example, the second value may be set as 2 to characterize the presence of an emergency service in progress, or the second value may be set as 8 to characterize the absence of an emergency service in progress.

In this manner, with this step, the terminal may obtain the first slice information corresponding to the first processing procedure, and then determine, based on the first slice information, whether a corresponding first UAC parameter is present. In addition, the terminal may further obtain the first access parameter.

At block 53, the terminal performs UAC based on the first slice information and the first access parameter.

That is, before transmitting an RRCRequest or an RRCResumeRequest, the terminal performs a UAC operation based on the slice information, the access category, and the access identity that are obtained from block 52. Specifically, description in this regard is made with the following cases.

Case 1: the terminal determines whether a first UAC parameter related to the first slice information is present in the first information.

The terminal performs, in response to the first UAC parameter related to the first slice information being present in the first information, the UAC based on the first UAC parameter related to the first slice information and the first access parameter.

When the first UAC parameter related to the first slice information determined by the action at block 52 is present in the first information of the system message broadcast corresponding to the first slice information, the terminal performs the UAC using the first UAC parameter related to the first slice information and taking the first access category and the first access identity in the first access parameter as inputs. Here, since the UAC has been described above, details thereof will be omitted herein.

Case 2: a processing in a first manner or a processing in a second manner is performed in response to no UAC parameter related to the first slice information being present in the first information.

Here, the processing in the first manner includes determining, by the terminal, that an access to the first processing procedure corresponding to the first slice information is prohibited; and the processing in the second manner includes using, by the terminal, the access control information irrelevant to the slice information in the first information for access control.

That is, when no UAC parameter related to the first slice information determined by the action at block 52 is present in the first information carried by the system message broadcast corresponding to the first slice information, two manners are available.

In the first manner, the terminal may determine that an access attempt relevant to the slice is barred (an access is prohibited); or it may be construed as that the terminal determines that an access corresponding to the first slice information (i.e., the first S-NSSAI) is prohibited.

In the second manner, the terminal uses a UAC parameter irrelevant to the slice information for access control.

Here, whether the processing in the first manner or the processing in the second manner is to be performed is determined based at least on a protocol provision or a configuration message transmitted by the network device.

That is, an adoption of the processing in the first manner or the processing in the second manner may be determined based on a protocol; or, the network may configure, based on the system message broadcast, the terminal to use the first manner or the second manner.

It should be understood that whether the processing in the first manner or the processing in the second manner is to be performed, when configured by a network side, may alternatively be determined based on RRC signaling, MAC CE, etc. Exhaustive description in this regard will be omitted here.

Case 3: the terminal adopts, in response to setting the first slice information as null, the access control information irrelevant to the slice information in the first information for access control.

That is, when the terminal does not determine any slice information at block 52, the terminal uses the UAC parameter irrelevant to the slice information for the access control.

With the solutions provided in this example, the network device and the terminal may each support a number of slices. Different UAC parameters are introduced for different slices to facilitate more accurate access control and resource allocation by the network. Correspondingly, determining the slice information relevant to establishing/resuming each connection may assist the network in access control in a slice dimension.

Example 2: an example of overload control based on slice information.

This example may be applied to at least the following two scenarios.

Scenario 1: a terminal may receive an RRC Reject message from the network during RRC setup or RRC Resume due to an overload of the network, and the network expects a UE to access the network later.

Scenario 2: when releasing a connection state of the terminal to an idle/inactive state, the network may expect the UE to access the network later due to an occurrence of overload.

Based on the above two scenarios, the network indicates wait time for a number of pieces of slice information in the RRC Reject message or the RRC Release message.

Figure 6:
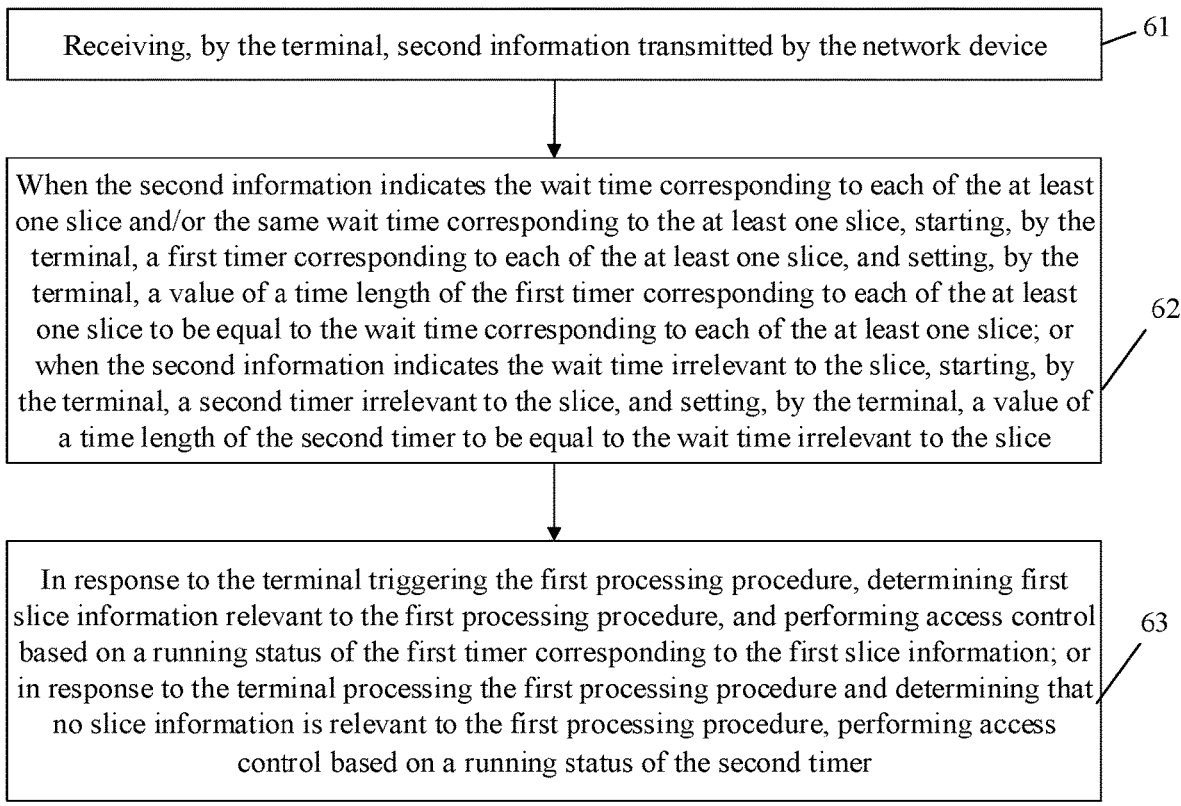
FIG. 6 is a second exemplary flowchart illustrating a control method for a slice network according to an embodiment of the present disclosure.

Specifically, referring to FIG. 6, actions at blocks 61 to 63 may be included.

At block 61, the terminal receives second information transmitted by the network device.

Here, the second information indicates at least one of: wait time corresponding to each of at least one slice, i.e., wait time separately for each slice of the at least one slice; same wait time corresponding to at least one slice, i.e., same wait time common to the at least one slice; or wait time irrelevant to a slice.

Correspondingly, the network device transmits second information to the terminal.

Here, the second information indicates at least one of: wait time corresponding to each of at least one slice; same wait time corresponding to at least one slice; or wait time irrelevant to a slice.

The second information is carried by RRC signaling. Specifically, the second information is carried by a reject message or an RRC release message.

Specifically, when the second information indicates wait time corresponding to each slice, a slice information list including at least one piece of slice information may be present. Wait time corresponding to each piece of slice information may be listed in order based on a sequence in the slice information list. Alternatively, each piece of slice information and wait time corresponding thereto may be set in the second information in sequence. Here, different slices may correspond to same or different wait time.

When the second information includes same wait time corresponding to at least one slice, a list including at least one piece of slice information may be set, and then same wait time corresponding to the list of the at least one piece of slice information may be set. It should be noted that a number of pieces of slice information may be set to correspond to same wait time, or a number of groups of slice information may be set, each group of the number of groups of slice information may correspond to same wait time. For example, the second information includes two groups of slice information, each group of the two groups of slice information includes at least one piece of slice information, and then wait time corresponding to each group may be indicated.

When the second information includes both wait time individually corresponding to each slice and wait time common to a number of slices, two different kinds of slices may be included. For example, the second information indicates that slice 1 corresponds to wait time 1 and slice 2 corresponds to wait time 2, and also includes slice group 1 including slice 3, slice 4, and slice 5 and corresponding to wait time 3 and slice group 2 including slice 6, slice 7, and slice 8 and corresponding to wait time 4.

When no slice is related to wait time, the second information may include only one value of wait time.

At block 62, when the second information indicates the wait time corresponding to each of the at least one slice and/or the same wait time corresponding to the at least one slice, the terminal starts a first timer corresponding to each of the at least one slice, and sets a value of a time length of the first timer corresponding to each of the at least one slice to be equal to the wait time corresponding to the slice; or when the second information indicates the wait time irrelevant to the slice, the terminal starts a second timer irrelevant to the slice, and sets a value of a time length of the second timer to be equal to the wait time irrelevant to the slice.

Specifically, the terminal may maintain, for each slice, an individual first timer which may be T302.

When the terminal receives the RRC Reject message or the RRC Release message, a corresponding T302 timer (the first timer) is started based on each piece of slice information indicated by the second information in the RRC message. A value of the T302 timer for each slice is a wait time value related to the slice. When the wait time value is not related to any slice, the UE starts the T302 timer that is unrelated to any slice.

It should be noted that when a number of slices are maintained in the terminal, with a part of which having corresponding wait time, a value of a time length of the first timer for each of this part of the slices is set to be equal to the corresponding wait time. In addition, when another part of the slices for which the second information indicates no wait time are present, a timer corresponding to this part of the slices is defined as the second timer. A time length of the second timer is set to be equal to wait time in the second information that is unrelated to any slice.

At block 63, in response to the terminal triggering the first processing procedure, the terminal determines first slice information relevant to the first processing procedure, and performs access control based on a running status of the first timer corresponding to the first slice information; or in response to the terminal processing the first processing procedure and determining that no slice information is relevant to the first processing procedure, the terminal performs access control based on a running status of the second timer.

Specifically, when the terminal expects to initiate RRC setup or RRC Resume, the terminal determines corresponding first S-NSSAI in accordance with the method provided in Example 1, and performs access control based on a running status/a timeout status of the first timer corresponding to the first S-NSSAI, i.e., the T302 timer. When the first S-NSSAI is null, the terminal performs access control based on a running status/a timeout status of the T302 timer that is unrelated to any slice.

The access control is the same as that in Example 1 described above, and thus details thereof will be omitted here.

With the solutions provided by this example, a network in an overload state (which may be due to backhaul or a resource allocation on a core network or an RAN side) may indicate different wait time to the terminal for different pieces of slice information, thereby helping the network to allow, based on a network load status, UEs accessing different slices to wait for different time lengths before re-accessing the network, and effectively realizing overload control at a granularity of slices.

Example 3: another example of overload control based on slice information.

In response to the terminal performing a second processing procedure, the terminal receives third information transmitted by the network device. Here, the third information includes relevant indication information of a slice and a corresponding BI value.

This example is directed to the second processing procedure, also known as the random access procedure. The third information may be carried by MSG 2 in a random processing procedure.

That is, during the random access procedure, when an RACH capacity overload occurs on the network side, the network may indicate the BI when transmitting MSG 2. After receiving the BI, the terminal performs, based on a value indicated by the BI, backoff before re-initiating a random access.

The relevant indication information of the slice may be understood as relevant indication information characterizing the slice information. For example, the relevant indication information of the slice may be codes corresponding to slice information (i.e., the S-NSSAI). In addition, the third information may include relevant indication information of one or more slices and a BI value corresponding to relevant indication information of each of the one or more slices.

Here, the relevant indication information of the slice in the third information is indicated by N reserved bits contained in a subheader of BI MAC signaling.

Figure 7:
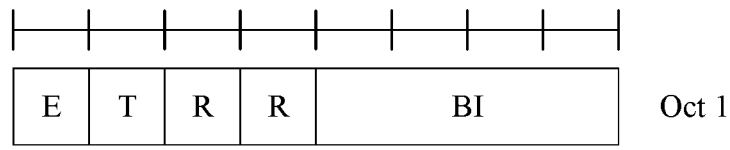
FIG. 7 is a schematic diagram showing a structure of a Media Access Control (MAC) header according to an embodiment of the present disclosure.

A specific design may be as illustrated in FIG. 7. Two R bits in a BI MAC subheader are used to indicate quantized S-NSSAI. A value 0/0 of R/R is reserved, and remaining values (0/1, 1/0, 1/1) of R/R may indicate three pieces of S-NSSAI.

A correspondence between the relevant indication information of the slice and the slice information is indicated by the network device. That is, the network device indicates to the terminal the correspondence between the relevant indication information of the slice and the slice information.

For example, three pieces of S-NSSAI corresponding to the three values of R/R may be indicated by signaling. In this manner, the UE can obtain, based on the correspondence combined with a value of the R/R or the BI value, the related slice information. For example, three pieces of S-NSSAI corresponding to the three values of R/R may be indicated by RRC signaling, and of course, or other information. Exhaustive description in this regard will be omitted here.

Specifically, the controlling, by the terminal based on the relevant information corresponding to the slice information, the processing between the terminal and the network device includes: determining, by the terminal, second slice information relevant to the second processing procedure; and re-initiating, by the terminal, the second processing procedure relevant to the second slice information after the terminal backs off, based on the BI value corresponding to the second slice information in the third information, the second processing procedure corresponding to the second slice information.

That is, the terminal may determine, upon receiving the third information, that the network side indicates backoff, determine the second slice information corresponding to the second processing procedure, search for a corresponding BI value from contents of the saved third information based on relevant indication information of a slice corresponding to the second slice information, back off a random access procedure corresponding to a second slice information based on the BI, and then, re-initiate a processing of the random access procedure related to the second slice information.

Figure 8:
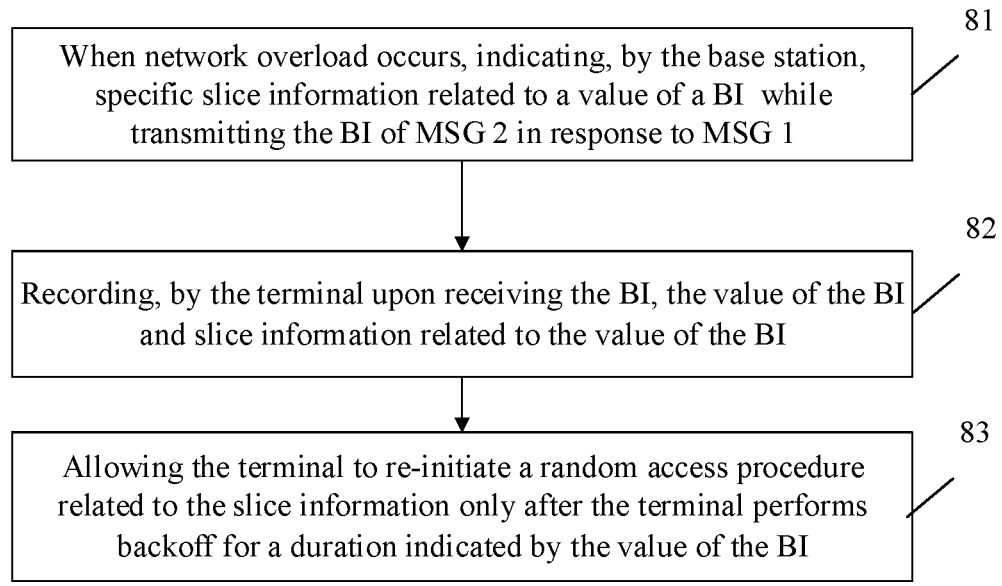
FIG. 8 is a third exemplary flowchart illustrating a control method for a slice network according to an embodiment of the present disclosure.

Exemplary illustration will be made with reference to FIG. 8.

At block 81, when network overload occurs, a base station indicates specific slice information related to a value of BI while transmitting the BI of MSG 2 in response to MSG 1.

At block 82, the terminal, upon receiving the BI, records the value of the BI and second slice information (which may be understood as second S-NSSAI) related to the value of the BI.

At block 83, the terminal is allowed to re-initiate a random access procedure related to the second slice information only after performing backoff for a duration indicated by the value of the BI.

It should be noted that, in order to perform an action at block 83, an RRC layer may notify an MAC layer of the slice information.

A processing of a random access may include the following random access methods. Specifically, in the NR, two random access methods are mainly supported, i.e., a contention-based random access method and a contention-free random access method.

Figure 9:
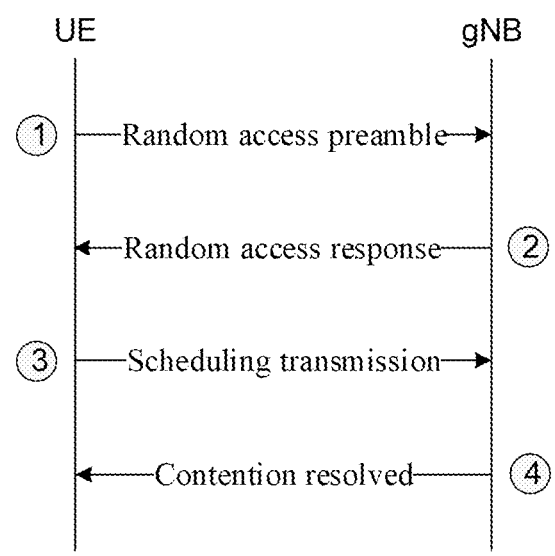
FIG. 9 is a flowchart illustrating one type of random access processing.

For a four-step contention-based random access procedure, reference may be made to FIG. 9.

Step 1: a terminal selects Physical Random Access CHannel (PRACH) resources (time-frequency resource and code-domain resource).

The terminal transmits a selected preamble on the selected PRACH time-frequency resource. The base station may estimate uplink Timing based on the preamble, and a size (which is an imprecise size, not a precise size) of grant required by the terminal to transmit a third-step message.

Step 2: a network transmits a Random Access Response (RAR) to the terminal.

After transmitting a first-step message (MSG 1), the terminal starts an RAR window and monitors a Physical Downlink Control CHannel (PDCCH) within the RAR window. The PDCCH is a PDCCH scrambled with a Random Access (RA) Radio Network Temporary Identifier (RNTI).

That is, the RA-RNTI is related to a PRACH video resource selected by the UE.

Figure 10:
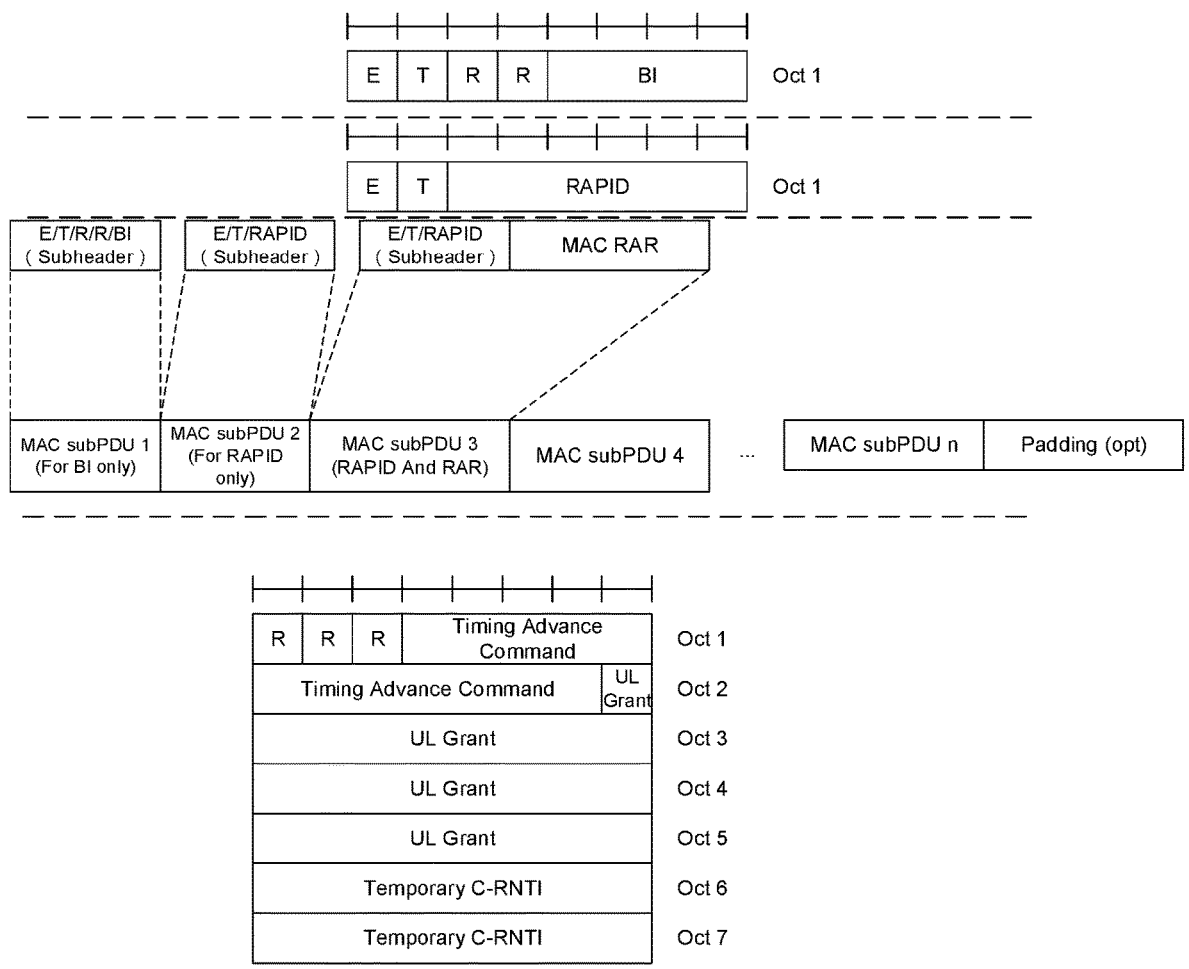
FIG. 10 is a schematic diagram showing a structure of an MAC Control Element (MAC CE) in a random access.

After successfully monitoring the PDCCH scrambled with the RA-RNTI, the terminal is capable of obtaining a Physical Downlink Shared CHannel (PDSCH) scheduled by the PDCCH. The PDSCH includes the RAR. FIG. 10 illustrates a format of the RAR. Description of the format is made below.

A subheader of the RAR includes a BI indicating a backoff time length for retransmission of the first-step message.

RAPID in the RAR is a response of a network to a received preamble index.

Payload of the RAR includes a Timing Advance Group (TAG) for adjusting uplink timing.

Uplink (UL) grant is used for scheduling an uplink resource indication of the third-step message.

Temporary Cell RNTI (C-RNTI) is used for scrambling a PDCCH (initial access) in a fourth-step message.

Step 3: the terminal transmits an RRC message on a scheduled resource.

MSG 3 is mainly used to inform the network what event triggers an RACH procedure. For example, when the RACH procedure is triggered by an initial random access procedure, a UE Identity (ID) and an establishment cause may be carried in MSG 3. When the RACH procedure is triggered by RRC re-establishment, a connected-state UE identity and an establishment cause may be carried in the MSG3.

Meanwhile, the ID carried in MSG 3 may allow a contention conflict to be resolved by an action at block 4.

Step 4: a contention conflict is resolved.

MSG 4 has two roles, one is for contention conflict resolution, and the other is for transmitting an RRC configuration message to the terminal.

Contention Conflict Resolution:

Manner 1: when the UE carries a C-RNTI in Step 3, the fourth-step message is scheduled by a PDCCH scrambled with the C-RNTI.

Manner 2: when the UE carries no C-RNTI in Step 3, e.g., for an initial access, the fourth-step message is scheduled by a PDCCH scrambled with Temporary Cell (TC)-RNTI. The conflict is resolved by receiving, by the UE, a PDSCH in the fourth-step message and matching a Common Control Channel (CCCH) Service Data Unit (SDU) in the PDSCH.

Figure 11:
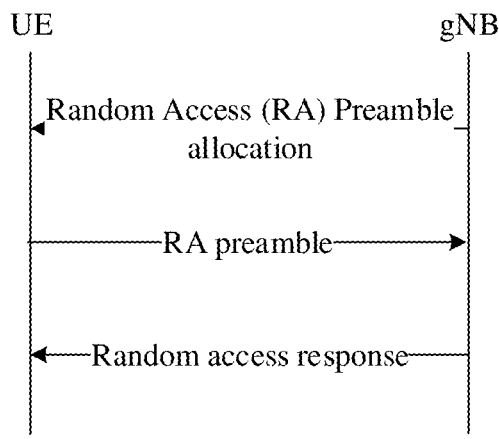
FIG. 11 is a flowchart illustrating another type of random access processing.

In addition, FIG. 11 illustrates a contention-free random access manner, and details thereof will not be repeated here.

In this example, the network device may allocate different RACH resources for different slices. Therefore, RACH resource overload may actually be refined to RACH resource overload corresponding to a certain slice. It is unreasonable to back off all terminals in response to RACH overload of one slice. Introducing a slice-specific BI helps the network achieve RACH overload control at a slice granularity, thereby mitigating an impact on a random access of a terminal to a non-overloaded slice.

As can be seen, with the above solutions, a processing corresponding to a slice may be performed based on access control information, backoff information, a timer, and other information related to the slice, thereby meeting new requirements for overload control and access control that are put forward by network services differentiated by slicing, providing fined-grained control at a slice level, and achieving an effect of optimizing network resource utilization and providing better services to users.

Figure 12:
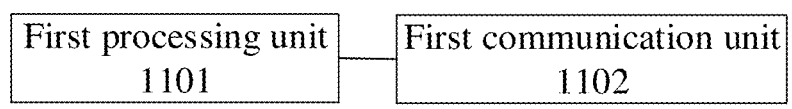
FIG. 12 is a schematic diagram showing a structure of a terminal device according to an embodiment of the present disclosure.

According to embodiments of the present disclosure, a terminal is provided. As illustrated in FIG. 12, the terminal includes a first processing unit 1101.

The first processing unit 1101 is configured to control, based on relevant information corresponding to slice information, a processing between the terminal and a network device. Here, the relevant information corresponding to the slice information includes at least one of access control information, a BI, or a timer.

Figure 13:
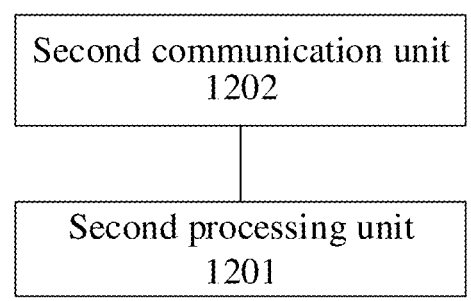
FIG. 13 is a schematic diagram showing a structure of a network device according to an embodiment of the present disclosure.

According to embodiments of the present disclosure, a network device is provided. As illustrated in FIG. 13, the network device includes a second processing unit 1201.

The second processing unit 1201 is configured to perform a processing corresponding to slice information between a terminal and the network device. Here, relevant information corresponding to the slice information includes at least one of access control information, a BI, or a timer.

Solutions provided by the embodiments may be applied in a slice network. The slice information may be S-NSSAI, and of course, may be in other forms, which are not exhaustively enumerated here. In addition, the network device may be an access network device in a network, e.g., a base station such as eNB, gNB, etc.

Based on the above description, a control method applied in a slice network provided by this embodiment is described in detail below in combination with various examples.

Example 1: access control based on slice information.

The terminal further includes a first communication unit 1102 configured to receive first information transmitted by the network device.

Here, the first information includes access control information corresponding to each of at least one piece of slice information and/or access control information irrelevant to the slice information.

Here, the first information may be carried by a system broadcast message or other signaling, e.g., RRC signaling, MAC CE signaling, etc. Exhaustive description in this regard will be omitted here.

Correspondingly, the network device further includes a second communication unit 1202 configured to transmit the first information to the terminal.

Specifically, the first information may include at least one of access control information corresponding to each of the at least one piece of slice information, one or more pieces of slice information corresponding to each piece of access control information, or access control information irrelevant to all of the slice information.

That is, the network device transmits the first information to the terminal. Specifically, the network device carries the first information in a system broadcast message and transmits the first information to the terminal. The first information may include one or more pieces of slice information and access control information corresponding to each piece of slice information, or may include access control information irrelevant to the slice information. Here, different pieces of slice information may correspond to same or different access control information.

Further, the access control information is a UAC parameter.

In the solutions provided by the embodiments, the UAC parameter is configured for slices. That is, the first information transmitted by the network device to the terminal includes the UAC parameter for slices.

Correspondingly, in response to the first processing unit 1101 of the terminal triggering a first processing procedure, the terminal determines first slice information and a first access parameter that are relevant to the first processing procedure, and performs UAC based on a first UAC parameter related to the first slice information and the first access parameter.

Here, the first processing procedure is an RRC establishment procedure or an RRC resuming procedure.

Solutions provided in this example will be described in detail.

The first communication unit 1102 of the terminal is configured to receive a system message broadcast transmitted by a network device of a serving cell. The system message broadcast carries first information. Here, the first information is access control information relevant to slice information. Specifically, the first information may include at least one of: one set of UAC parameters that is related to each slice (S-NSSAI) and is broadcasted by the network; one set of UAC parameters that is related to multiple slices (S-NSSAI); or a UAC parameter unrelated to the slice information (e.g., a UAC parameter in an existing System Information Block 1 (SIB1)), the UAC parameter being used for access control when no slice information is provided during establishing/resuming a connection by the NAS or an RRC layer.

The terminal determines, in response to the first processing unit 1101 of the terminal triggering a first processing procedure, first slice information and a first access parameter that are relevant to the first processing procedure.

Here, the first processing procedure may be an RRC establishment process or an RRC resuming procedure.

That is, specifically, when an RRC setup procedure or an RRC resume procedure is triggered on a terminal side, the terminal determines slice information, an access category, and an access identity that are relevant to the RRC setup procedure or the RRC resume procedure.

Here, the first processing unit 1101 of the terminal is configured to perform one of: indicating, by an NAS in response to triggering the first processing procedure, the first slice information and the first access parameter to an AS, in which the first access parameter includes a first access category and a first access identity; or in response to an AS triggering the first processing procedure based on an NG RAN paging, determining, by the terminal, slice information used for a previous RRC connection as the first slice information, setting, by the terminal, a first access category in the first access parameter as a first value, and adopting, by the terminal, an access identity indicated by an NAS as a first access identity in the first access parameter; or in response to triggering the first processing procedure by an RNA update, setting, by an AS of the terminal, the first slice information as null, setting, by the terminal, a first access category in the first access parameter as a second value, and adopting, by the terminal, an access identity indicated by an NAS as a first access identity in the first access parameter.

The first processing unit 1101 of the terminal is configured to perform the UAC control based on the first slice information and the first access parameter.

Specifically, description in this regard is made with the following cases.

Case 1: the first processing unit 1101 of terminal is configured to determine whether a first UAC parameter related to the first slice information is present in the first information.

The terminal performs, in response to the first UAC parameter related to the first slice information being present in the first information, the UAC based on the first UAC parameter related to the first slice information and the first access parameter.

Case 2: the first processing unit 1101 is configured to perform, in response to no UAC parameter related to the first slice information being present in the first information, a processing in a first manner or a processing in a second manner.

Here, the processing in the first manner includes determining, by the terminal, that an access to the first processing procedure corresponding to the first slice information is prohibited; and the processing in the second manner includes using, by the terminal, the access control information irrelevant to the slice information in the first information for access control.

Here, whether the processing in the first manner or the processing in the second manner is to be performed is determined based on a protocol provision or a configuration message transmitted by the network device.

Case 3: the first processing unit 1101 is configured to adopt, in response to setting the first slice information as null, the access control information irrelevant to the slice information in the first information for access control.

Example 2: an example of overload control based on slice information.

This example may be applied to at least the following two scenarios.

Scenario 1: a terminal may receive an RRC Reject message from the network during RRC setup or RRC Resume due to an overload of the network, and the network expects a UE to access the network later.

Scenario 2: when releasing a connection state of the terminal to an idle/inactive state, the network may expect the UE to access the network later due to an occurrence of overload.

Based on the above two scenarios, the network indicates wait time for a number of pieces of slice information in the RRC Reject message or the RRC Release message.

Specifically, the first communication unit 1102 of the terminal is configured to receive second information transmitted by the network device.

Here, the second information indicates at least one of: wait time corresponding to each of at least one slice, i.e., wait time separately for each of the at least one slice; same wait time corresponding to at least one slice, i.e., same wait time common to the at least one slice; or wait time irrelevant to a slice.

Correspondingly, the second communication unit 1202 of the network device is configured to transmit second information to the terminal.

Here, the second information indicates at least one of: wait time corresponding to each of at least one slice; same wait time corresponding to at least one slice; or wait time irrelevant to a slice.

The second information is carried by RRC signaling. Specifically, the second information is carried by a reject message or an RRC release message.

The first processing unit 1101 is configured to, when the second information indicates the wait time corresponding to each of the at least one slice and/or the same wait time corresponding to the at least one slice, start a first timer corresponding to each of the at least one slice, and set a value of a time length of the first timer corresponding to each of the at least one slice to be equal to the wait time corresponding to the slice; or when the second information indicates the wait time irrelevant to the slice, start a second timer irrelevant to the slice, and set a value of a time length of the second timer to be equal to the wait time irrelevant to the slice.

The first processing unit 1101 of the terminal is configured to, in response to the terminal triggering the first processing procedure, determine first slice information relevant to the first processing procedure, and perform access control based on a running status of the first timer corresponding to the first slice information; or in response to the terminal processing the first processing procedure and determining that no slice information is relevant to the first processing procedure, perform access control based on a running status of the second timer.

Example 3: another example of overload control based on slice information.

In response to the first communication unit 1102 of the terminal performing a second processing procedure, the terminal receives third information transmitted by the network device. Here, the third information includes relevant indication information of a slice and a corresponding BI value.

Correspondingly, the second communication unit 1202 of the network device is configured to transmit, in response to the terminal performing the second processing procedure, the third information to the terminal.

This example is directed to the second processing procedure, also known as the random access procedure. The third information may be carried by MSG 2 in a random processing procedure.

The relevant indication information of the slice may be understood as relevant indication information characterizing the slice information. For example, the relevant indication information of the slice may be codes corresponding to slice information (i.e., the S-NSSAI). In addition, the third information may include relevant indication information of one or more slices and a BI value corresponding to relevant indication information of each of the one or more slices.

Here, the relevant indication information of the slice in the third information is indicated by N reserved bits contained in a subheader of BI MAC signaling.

A correspondence between the relevant indication information of the slice and the slice information is indicated by the network device. That is, the second communication unit 1202 of the network device is configured to indicate to the terminal the correspondence between the relevant indication information of the slice and the slice information.

Specifically, the first processing unit 1101 of the terminal is configured to determine second slice information relevant to the second processing procedure; and re-initiate the second processing procedure relevant to the second slice information after backing off, based on the BI value corresponding to the second slice information in the third information, the second processing procedure corresponding to the second slice information.

As can be seen, with the above solutions, a processing corresponding to each slice may be performed based on access control information, backoff information, a timer, and other information related to the slice, thereby meeting new requirements for overload control and access control that are put forward by network services differentiated by slicing, providing fined-grained control at a slice level, and achieving an effect of optimizing network resource utilization and providing better services to users.

Figure 14:
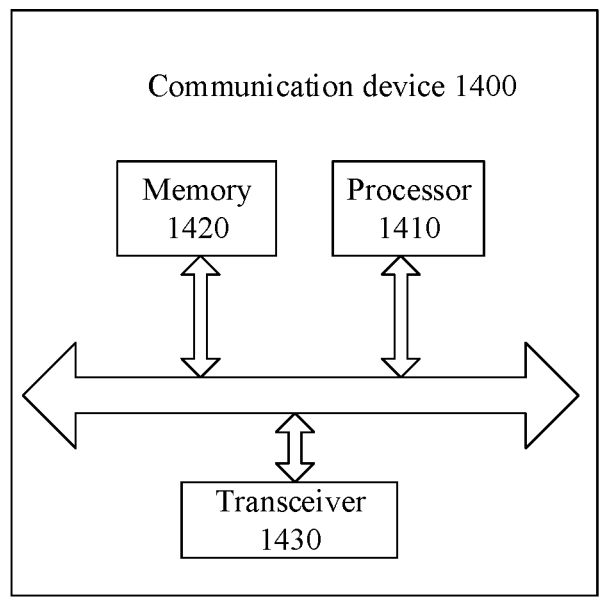
FIG. 14 is a schematic diagram showing a structure of a communication device according to an embodiment of the present disclosure.

FIG. 14 is a schematic block diagram showing a structure of a communication device 1400 according to an embodiment of the present disclosure. The communication device may be a terminal device or a network device in any of the above embodiments. The communication device 1400 illustrated in FIG. 14 includes a processor 1410. The processor 1410 is configured to invoke and execute a computer program from a memory to perform the method according to any of the embodiments of the present disclosure.

Optionally, as illustrated in FIG. 14, the communication device 1400 may further include a memory 1420. The processor 1410 may invoke and execute a computer program from the memory 1420 to perform the method according to any of the embodiments of the present disclosure.

Here, the memory 1420 may be a separate component independent of the processor 1410, or may be integrated in the processor 1410.

Optionally, as illustrated in FIG. 14, the communication device 1400 may further include a transceiver 1430. The processor 1410 may control the transceiver 1430 to communicate with other devices, specifically, to transmit information or data to other devices, or receive information or data transmitted by other devices.

Here, the transceiver 1430 may include a transmitter and a receiver. The transceiver 1430 may further include one or more antennas.

Optionally, the communication device 1400 may specifically be a network device according to an embodiment of the present disclosure. The communication device 1400 may execute corresponding processes implemented by the network device in the method according to any of the embodiments of the present disclosure. For brevity, details thereof will be omitted herein.

Optionally, the communication device 1400 may specifically be the terminal device or network device according to any of the embodiments of the present disclosure. The communication device 1400 may implement corresponding processes implemented by the mobile terminal/terminal device in the method according to any of the embodiments of the present disclosure. For brevity, details thereof will be omitted herein.

Figure 15:
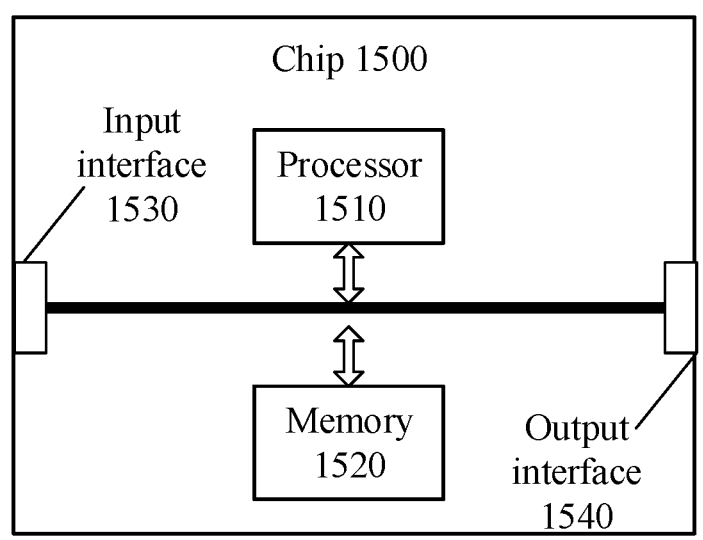
FIG. 15 is a schematic block diagram showing a chip according to an embodiment of the present disclosure.

FIG. 15 is a schematic block diagram showing a structure of a chip according to an embodiment of the present disclosure. A chip 1500 illustrated in FIG. 15 includes a processor 1510. The processor 1510 can invoke and execute a computer program from a memory to perform the method according to any of the embodiments of the present disclosure.

Optionally, as illustrated in FIG. 15, the chip 1500 may further include a memory 1520. The processor 1510 may invoke and execute a computer program from the memory 1520 to perform the method according to any of the embodiments of the present disclosure.

Here, the memory 1520 may be a separate component independent of the processor 1510, or may be integrated in the processor 1510.

Optionally, the chip 1500 may further include an input interface 1530. The processor 1510 can control the input interface 1530 to communicate with other devices or chips, specifically to obtain information or data transmitted by other devices or chips.

Optionally, the chip 1500 may further include an output interface 1540. The processor 1510 can control the output interface 1540 to communicate with other devices or chips, specifically to output information or data to other devices or chips.

Optionally, the chip can be applied to the network device according to any of the embodiments of the present disclosure. In addition, the chip can implement corresponding processes implemented by the network device in the method according to any of the embodiments of the present disclosure. For brevity, details thereof will be omitted herein.

Optionally, the chip can be applied to the terminal device according to any of the embodiments of the present disclosure. The chip can implement corresponding processes implemented by the terminal device in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

Figure 16:
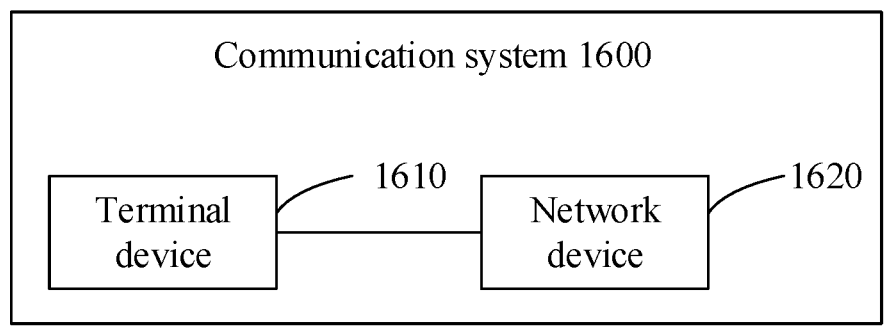
FIG. 16 is a second schematic diagram showing a communication system architecture according to an embodiment of the present disclosure.

FIG. 16 is a schematic block diagram showing a communication system 1600 according to an embodiment of the present disclosure. As illustrated in FIG. 16, the communication system 1600 includes a terminal device 1610 and a network device 1620.

Here, the terminal device 1610 can be configured to implement the corresponding functions implemented by the terminal device in the above methods. The network device 1620 can be configured to implement corresponding functions implemented by the network device in the above methods. For brevity, details thereof will be omitted herein.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure further provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure further provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure further provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A control method for a slice network, the control method comprising:
   controlling, by a terminal based on relevant information corresponding to slice information, a processing between the terminal and a network device, wherein the relevant information corresponding to the slice information comprises at least one of access control information, a Backoff Indicator (BI), or a timer;
   the control method further comprising:
   in response to the terminal performing a random access procedure, receiving, by the terminal, third information transmitted by the network device, wherein the third information comprises relevant indication information of a slice and a corresponding BI value, and the third information is carried by MSG 2 in a random processing procedure;
   wherein controlling, by the terminal based on the relevant information corresponding to the slice information, the processing between the terminal and the network device comprises:
   determining, by the terminal, second slice information relevant to the random access procedure; and
   re-initiating, by the terminal, the random access procedure relevant to the second slice information, after the terminal backs off, based on the BI value corresponding to the second slice information in the third information, the random access procedure corresponding to the second slice information;
   the control method further comprising:
   receiving, by the terminal, first information transmitted by the network device,
   wherein the first information comprises:
   access control information corresponding to each of at least one piece of slice information; and/or access control information irrelevant to the slice information,
wherein the access control information is a Unified Access Control (UAC) parameter, and the first information is carried by a system broadcast message;
wherein controlling, by the terminal based on the relevant information corresponding to the slice information, the processing between the terminal and the network device comprises:
determining, by the terminal in response to triggering a Radio Resource Control (RRC) establishment procedure or an RRC resuming procedure, first slice information and a first access parameter that are relevant to the RRC establishment procedure or the RRC resuming procedure; and
performing, by the terminal, UAC based on the first slice information and the first access parameter;
wherein determining, by the terminal, the first slice information and the first access parameter that are relevant to the RRC establishment procedure or the RRC resuming procedure is performed by one of:
indicating, by a Non-Access Stratum (NAS) of the terminal in response to triggering the RRC establishment procedure or the RRC resuming procedure, the first slice information and the first access parameter to an Access Stratum (AS), wherein the first access parameter comprises a first access category and a first access identity; or
in response to an AS of the terminal triggering the RRC establishment procedure or the RRC resuming procedure based on a Next Generation (NG) Radio Access Network RAN) paging, determining, by the terminal, slice information used for a previous RRC connection as the first slice information, setting, by the terminal, a first access category in the first access parameter as a first value, and adopting, by the terminal, an access identity indicated by an NAS as a first access identity in the first access parameter; or
in response to the terminal triggering the RRC establishment procedure or the RRC resuming procedure by an RAN Notification Area (RNA) update, setting, by an AS of the terminal, the first slice information as null, setting, by the terminal, a first access category in the first access parameter as a second value, and adopting, by the terminal, an access identity indicated by an NAS as a first access identity in the first access parameter;
the control method further comprising:
adopting, by the terminal in response to setting the first slice information as null, the access control information irrelevant to the slice information in the first information for access control.

2. The method according to claim 1, further comprising:
receiving, by the terminal, second information transmitted by the network device,
wherein the second information indicates at least one of:
wait time corresponding to each of at least one slice;
same wait time corresponding to at least one slice; or
wait time irrelevant to a slice.

3. The method according to claim 2, wherein the second information is carried by a Radio Resource Control (RRC) reject message or an RRC release message.

4. The method according to claim 2, further comprising at least one of:
when the second information indicates the wait time corresponding to each of the at least one slice and/or the same wait time corresponding to the at least one slice, starting, by the terminal, a first timer corresponding to each of the at least one slice, and setting, by the terminal, a value of a time length of the first timer corresponding to each of the at least one slice to be equal to the wait time corresponding to the slice; or
when the second information indicates the wait time irrelevant to the slice, starting, by the terminal, a second timer irrelevant to the slice, and setting, by the terminal, a value of a time length of the second timer to be equal to the wait time irrelevant to the slice.

5. The method according to claim 4, wherein controlling, by the terminal based on the relevant information corresponding to the slice information, the processing between the terminal and the network device comprises at least one of:
in response to the terminal triggering a Radio Resource Control (RRC) establishment procedure or an RRC resuming procedure, determining first slice information relevant to the RRC establishment procedure or the RRC resuming procedure, and performing access control based on a running status of the first timer corresponding to the first slice information; or
in response to the terminal processing an RRC establishment procedure or an RRC resuming procedure and determining that no slice information is relevant to the RRC establishment procedure or the RRC resuming procedure, performing access control based on a running status of the second timer.

6. The method according to claim 1, wherein performing, by the terminal, the UAC based on the first slice information and the first access parameter comprises:
performing, by the terminal in response to a first UAC parameter related to the first slice information being present in the first information, the UAC based on the first UAC parameter related to the first slice information and the first access parameter;
performing a processing in a first manner or a processing in a second manner in response to no UAC parameter related to the first slice information being present in the first information,
wherein the processing in the first manner comprises determining, by the terminal, that an access to the RRC establishment procedure or the RRC resuming procedure corresponding to the first slice information is prohibited; and
the processing in the second manner comprises using, by the terminal, the access control information irrelevant to the slice information in the first information for access control.

7. A control method for a slice network, the control method comprising:
performing a processing corresponding to slice information between a network device and a terminal,
wherein relevant information corresponding to the slice information comprises at least one of access control information, a Backoff Indicator (BI), or a timer;
the control method further comprising:
in response to the terminal performing a random access procedure, transmitting, by the network device, third information to the terminal, wherein the third information comprises relevant indication information of a slice and a corresponding BI value, and the third information is carried by MSG 2 in a random processing procedure,
to cause the terminal to:
determine second slice information relevant to the random access procedure; and re-initiate the random access procedure relevant to the second slice information, after the terminal backs off, based on the BI value corresponding to the second slice information in the third information, the random access procedure corresponding to the second slice information;

the control method further comprising:
transmitting, by the network device, first information to the terminal,
wherein the first information comprises:
access control information corresponding to each of at least one piece of slice information; and/or
access control information irrelevant to the slice information,
wherein the access control information is a Unified Access Control (UAC) parameter, and the first information is carried by a system broadcast message;
to cause the terminal to:
determine, in response to triggering a Radio Resource Control (RRC) establishment procedure or an RRC resuming procedure, first slice information and a first access parameter that are relevant to the RRC establishment procedure or the RRC resuming procedure; and
perform UAC based on the first slice information and the first access parameter;
to cause the terminal further to:
indicate, in response to a Non-Access Stratum (NAS) of the terminal triggering the RRC establishment procedure or the RRC resuming procedure, the first slice information and the first access parameter to an Access Stratum (AS), wherein the first access parameter comprises a first access category and a first access identity; or
in response to an AS of the terminal triggering the RRC establishment procedure or the RRC resuming procedure based on a Next Generation (NG) Radio Access Network (RAN) paging, determine slice information used for a previous RRC connection as the first slice information, set a first access category in the first access parameter as a first value, and adopt an access identity indicated by an NAS as a first access identity in the first access parameter; or
in response to the terminal triggering the RRC establishment procedure or the RRC resuming procedure by an RAN Notification Area (RNA) update, set the first slice information as null, set a first access category in the first access parameter as a second value, and adopt an access identity indicated by an NAS as a first access identity in the first access parameter:
to cause the terminal further to:
adopt, in response to setting the first slice information as null, the access control information irrelevant to the slice information in the first information for access control.

8. The method according to claim 7, further comprising:
transmitting, by the network device, second information to the terminal,
wherein the second information indicates at least one of:
wait time corresponding to each of at least one slice;
same wait time corresponding to at least one slice; or
wait time irrelevant to a slice.

9. The method according to claim 8, wherein the second information is carried by a Radio Resource Control (RRC) reject message or an RRC release message.

10. A terminal device, comprising a processor, and a memory for storing a computer program executable on the processor,
wherein the memory has a computer program stored thereon, and the processor is configured to invoke and execute the computer program stored in the memory to:
control a processing between the terminal device and a network device based on relevant information corresponding to slice information, wherein the relevant information corresponding to the slice information comprises at least one of access control information, a Backoff Indicator (BI), or a timer;
wherein the processor is further configured to invoke and execute the computer program stored in the memory to:
in response to the terminal performing a random access procedure, receive third information transmitted by the network device, wherein the third information comprises relevant indication information of a slice and a corresponding BI value, and the third information is carried by MSG 2 in a random processing procedure;
determine second slice information relevant to the random access procedure; and
re-initiate the random access procedure relevant to the second slice information, after the terminal backs off, based on the BI value corresponding to the second slice information in the third information, the random access procedure corresponding to the second slice information;
wherein the processor is further configured to invoke and execute the computer program stored in the memory to:
receive first information transmitted by the network device,
wherein the first information comprises:
access control information corresponding to each of at least one piece of slice information; and/or
access control information irrelevant to the slice information,
wherein the access control information is a Unified Access Control (UAC) parameter, and the first information is carried by a system broadcast message;
wherein the processor is further configured to invoke and execute the computer program stored in the memory to:
determine, in response to triggering a Radio Resource Control (RRC) establishment procedure or an RRC resuming procedure, first slice information and a first access parameter that are relevant to the RRC establishment procedure or the RRC resuming procedure; and
perform UAC based on the first slice information and the first access parameter;
wherein the processor is further configured to invoke and execute the computer program stored in the memory to:
indicate, in response to a Non-Access Stratum (NAS) of the terminal triggering the RRC establishment procedure or the RRC resuming procedure, the first slice information and the first access parameter to an Access Stratum (AS), wherein the first access parameter comprises a first access category and a first access identity; or
in response to an AS of the terminal triggering the RRC establishment procedure or the RRC resuming procedure based on a Next Generation (NG) Radio Access Network (RAN) paging, determine slice information used for a previous RRC connection as the first slice information, set a first access category in the first access parameter as a first value, and adopt an access identity indicated by an NAS as a first access identity in the first access parameter; or in response to the terminal triggering the RRC establishment procedure or the RRC resuming procedure by an RAN Notification Area (RNA) update, set the first slice information as null, set a first access category in the first access parameter as a second value, and adopt an access identity indicated by an NAS as a first access identity in the first access parameter:

wherein the processor is further configured to invoke and execute the computer program stored in the memory to:

adopt, in response to setting the first slice information as null, the access control information irrelevant to the slice information in the first information for access control.

11. The terminal device according to claim 10, wherein the processor is further configured to invoke and execute the computer program stored in the memory to:

receive second information transmitted by the network device, wherein the second information indicates at least one of:
wait time corresponding to each of at least one slice;
same wait time corresponding to at least one slice; or
wait time irrelevant to a slice.

12. A network device, comprising a processor, and a memory for storing a computer program executable on the processor, wherein the memory has a computer program stored thereon, and the processor is configured to invoke and execute the computer program stored in the memory to perform steps of the method according to claim 7.

13. The network device according to claim 12, wherein the processor is further configured to invoke and execute the computer program stored in the memory to transmit second information to the terminal, wherein the second information indicates at least one of:
wait time corresponding to each of at least one slice;
same wait time corresponding to at least one slice; or
wait time irrelevant to a slice.

* * * * *